June 10, 1930.  O. C. ROESEN  1,762,309
MAT ROASTER
Filed Aug. 11, 1926  5 Sheets-Sheet 3

June 10, 1930.  O. C. ROESEN  1,762,309
MAT ROASTER
Filed Aug. 11, 1926  5 Sheets-Sheet 4

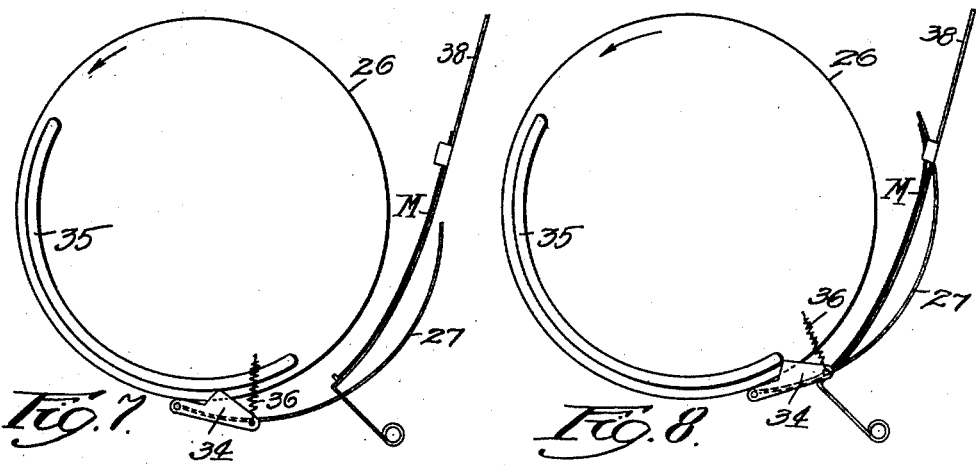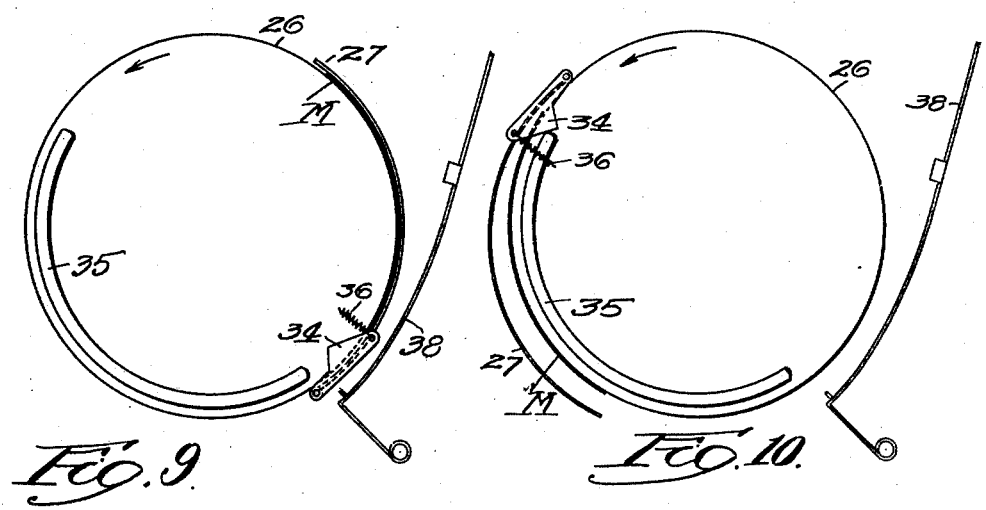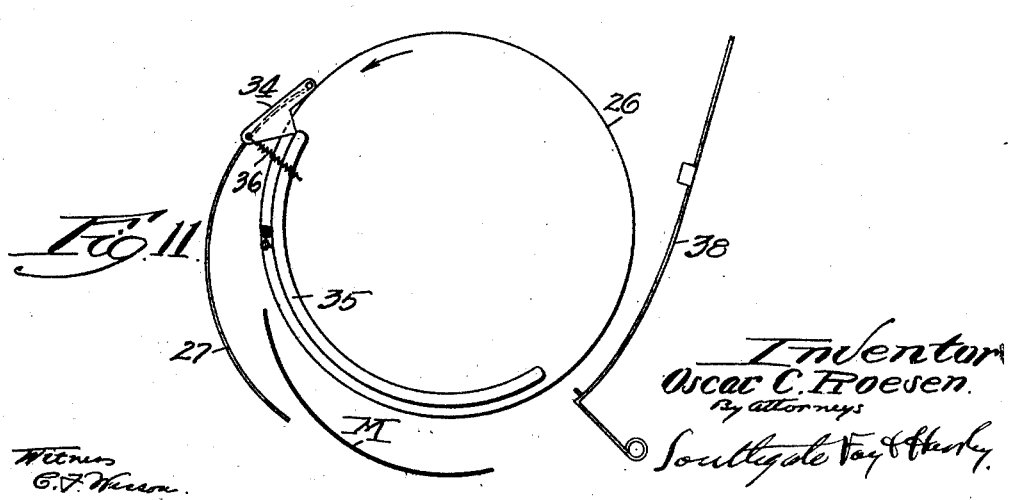

Patented June 10, 1930

1,762,309

UNITED STATES PATENT OFFICE

OSCAR CHARLES ROESEN, OF BROOKLYN, NEW YORK, ASSIGNOR TO WOOD NEWSPAPER MACHINERY CORPORATION, OF NEW YORK, N. Y., A CORPORATION OF VIRGINIA

MAT ROASTER

Application filed August 11, 1926. Serial No. 128,687.

This invention relates to a device for drying or roasting matrices used in the casting of stereotype printing plates.

The principal objects of the invention are to provide a machine which will roast the matrices continuously; which will continue the roasting operation exactly the same length of time for all matrices so as to get uniform results; which will roast more than one matrix at a time and greatly speed up this operation; also to provide a machine in which the matrices are introduced into the roaster and taken from it, preferably without placing them by hand in exactly the position desired and without handling them at all when they are delivered; and to provide also for automatic introduction and delivery of the matrices.

Other objects and advantages of the invention will appear hereinafter.

Reference is to be had to the accompanying drawings in which—

Fig. 6 is an enlarged end view of one of the operating levers for automatically engaging and releasing the matrices; and Figs. 7, 8, 9, 10 and 11 are diagrammatic end views showing the various steps of the operation of this form of the invention.

Heretofore this roasting operation has been practically carried on by hand in a very inaccurate way and the degree of roasting has been dependent upon the judgment of the operator. The device as used at present involves the placing of a single matrix in the roasting oven by hand and its proper positioning in the same way. It is roasted for as long a time as the operator may desire. If the capacity is only one matrix, it cannot be speeded up in case of emergency in any way. It is for the purpose of obviating these difficulties and increasing uniformity of the products that this invention has been devised.

Figure 1:
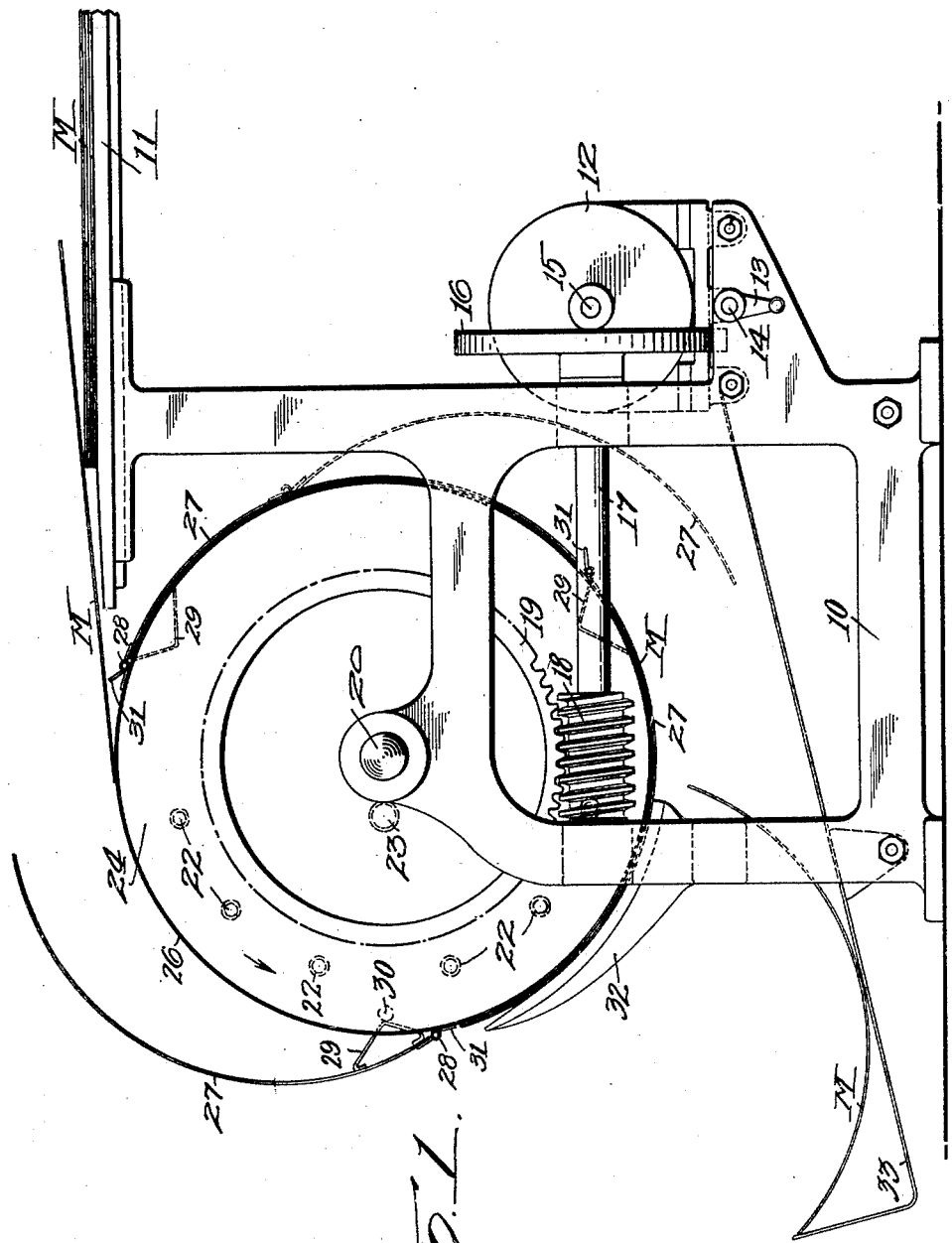
Fig. 1 is an end view of a rotary roaster constructed in accordance with this invention.
Figure 2:
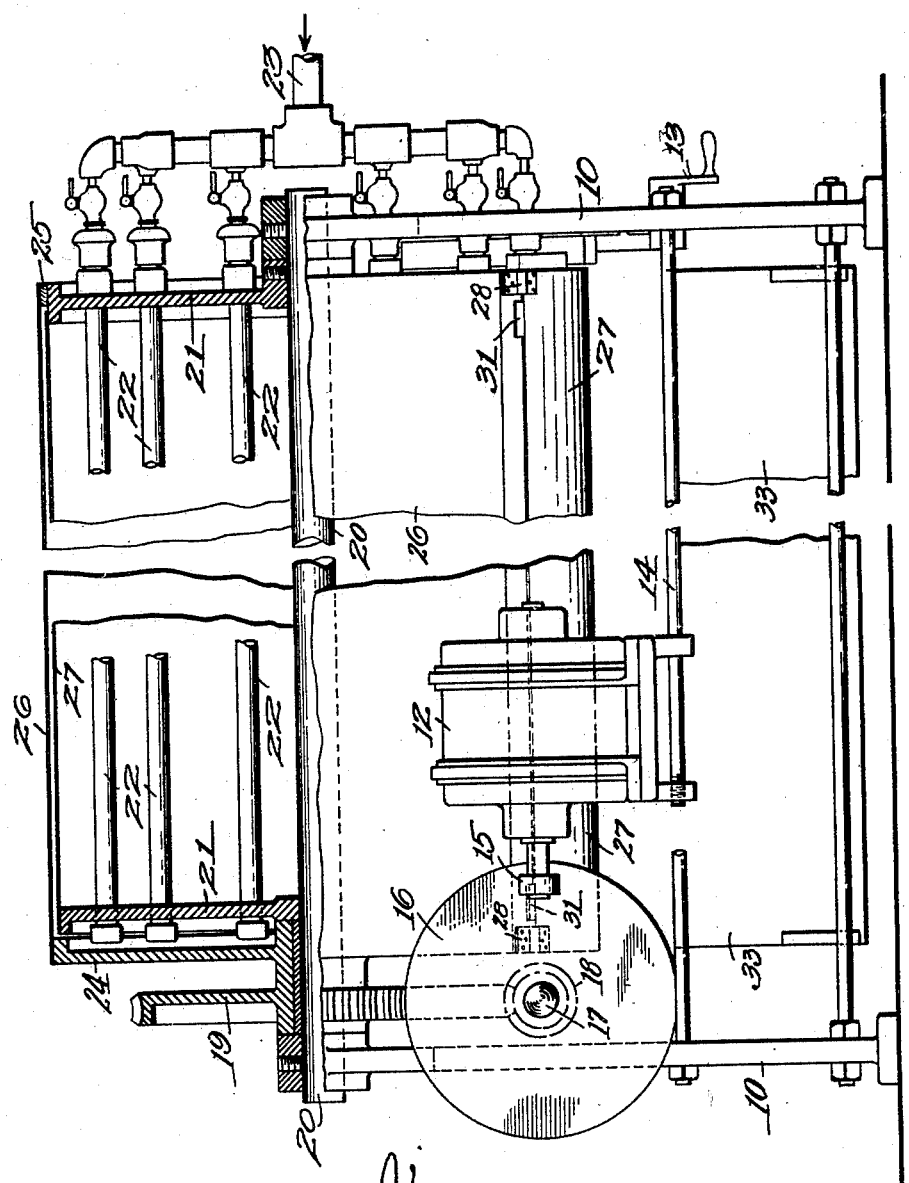
Fig. 2 is a rear view thereof partly in section on a vertical plane extending through the axis of the roasting drum.

Referring to the form shown in Figs. 1 and 2 I have shown a matrix roaster comprising a frame 10, having a board or platform 11 for receiving the matrices M from a pile from which they are delivered by hand or otherwise to the roaster. The roaster is operated by a motor 12, mounted suitably on the frame and capable of longitudinal adjustment by a crank 13 and threaded rod 14. This is for the purpose of moving the motor bodily so that a driving roll 15 on the shaft thereof can be moved along the face of the friction disc 16 to vary the speed of this disc. The disc 16 is mounted on a shaft 17 provided with a worm 18 operating a worm wheel 19 on the roaster shaft 20. It will be seen therefore that the shaft 20 can be driven at such speed as may be desired and that also the speed is cut down.

On this shaft 20 is loosely mounted a receptacle or drum 21 provided with steam pipes 22, fed by a supply 23, these parts being mounted in a stationary position but centered on the shaft 20. Rotatable with the gear or worm wheel 19 is a head 24 of the drum closing one end of it. The other end is closed by a ring 25 resting on the circumference of one of the stationary ends 21. The drum is closed by a cylindrical sheet metal wall 26. It may be stated at this point that the stationary drum heads 21 are also surrounded by a cylindrical wall 27$^a$ spaced from the wall 26.

On the outside of the rotating drum 26 which is a continuous cylinder are a plurality of movable walls or covers 27, each pivoted to the drum by hinges 28. I have shown three of these covers. Each one is provided with a spring cam 29 adapted to be operated by a rod 30 fixed in stationary position between the ends 21.

Each cover is pivoted on a shaft and is provided with a stop 31 for limiting the outward movement of the cover. The frame is provided with a stationary plate 32 for positively holding the covers down in a certain position and there is a delivery chute 33 for receiving the matrices.

In the operation of this machine the crank 13 is turned until the proper speed of rotation of the drum is secured to drop the matrices properly. The pile of matrices M is in a convenient position and when the drum comes around to the point shown in Fig. 1 a matrix is moved into it. It will be noticed that at that time the cam 29 engages the rod 30 and the upper cover 27 is raised so that the matrix can be lowered into the pocket thus formed. As the drum rotates past the rod 30, the cover 27 moves from against the drum first by gravity and then is held there by the stationary plate 32. This cover 27 forces the matrix to assume a curved shape of the right diameter because the drum 26 is of the same radius as the outer surface of the printing plate to be cast. Therefore the matrix will be dried at the right curvature.

As the drum continues to rotate, as soon as the tail end of the cover 27 passes the lower edge of the plate 32 it will swing down by gravity and allow the matrix to drop by gravity into the chute or stand 33. As the drum now continues to rotate, the particular cover 27 which has been described will stay open until it reaches the top of the drum when it is closed by gravity and then it will open by the rod 30 when it reaches the position shown in Fig. 1.

It will be seen that in Fig. 1, three of these covers are shown, one in roasting position, one in raised position and one in idle position against the drum.

Referring now to the form shown in the last three sheets, it may be stated in general that this is a very similar machine with certain details different. The principal feature is that it is arranged to pick the matrix automatically from a set of guides in which the matrix has been received from a chute leading from the composing room. Whenever a matrix is ready to be roasted it is dropped through the chute into the guide and the roaster automatically picks it up and automatically delivers it.

In this case the operating means is the same. The construction of the drum also is the same and the way of heating it. The covers 27 are pivoted in the same way on hinges 28 but each one is provided with an operating lever 34 which cooperates with an arcuate cam 35 located in stationary position on one of the ends 21 and adapted to manipulate this cam 34 in opposition to a spring 36. The spring holds the cover 27 against the drum whenever the lever 34 is not in contact with the cam. It is necessary therefore that the cover be closed at all other times.

Figure 3:
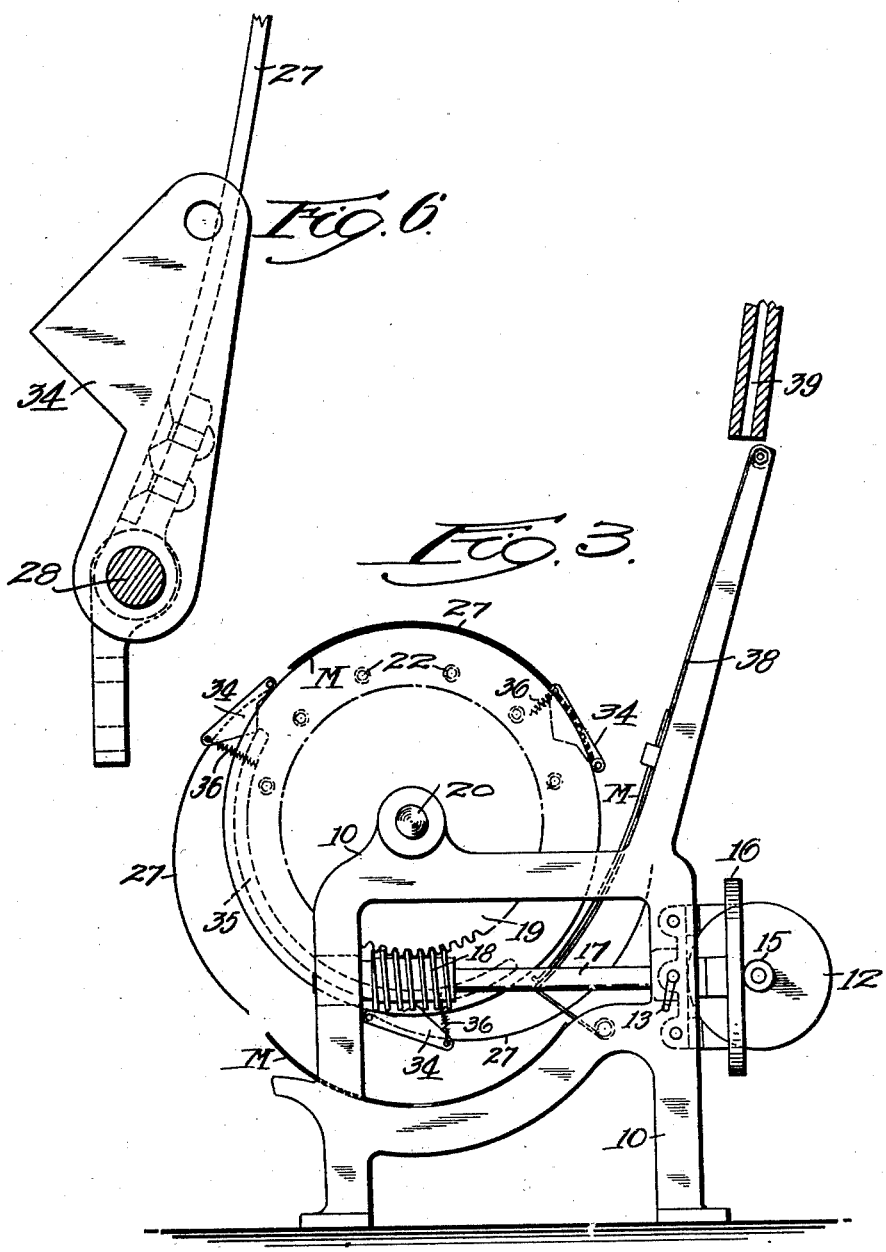
Fig. 3 is a view similar to Fig. 1 showing a modified construction.
Figure 4:
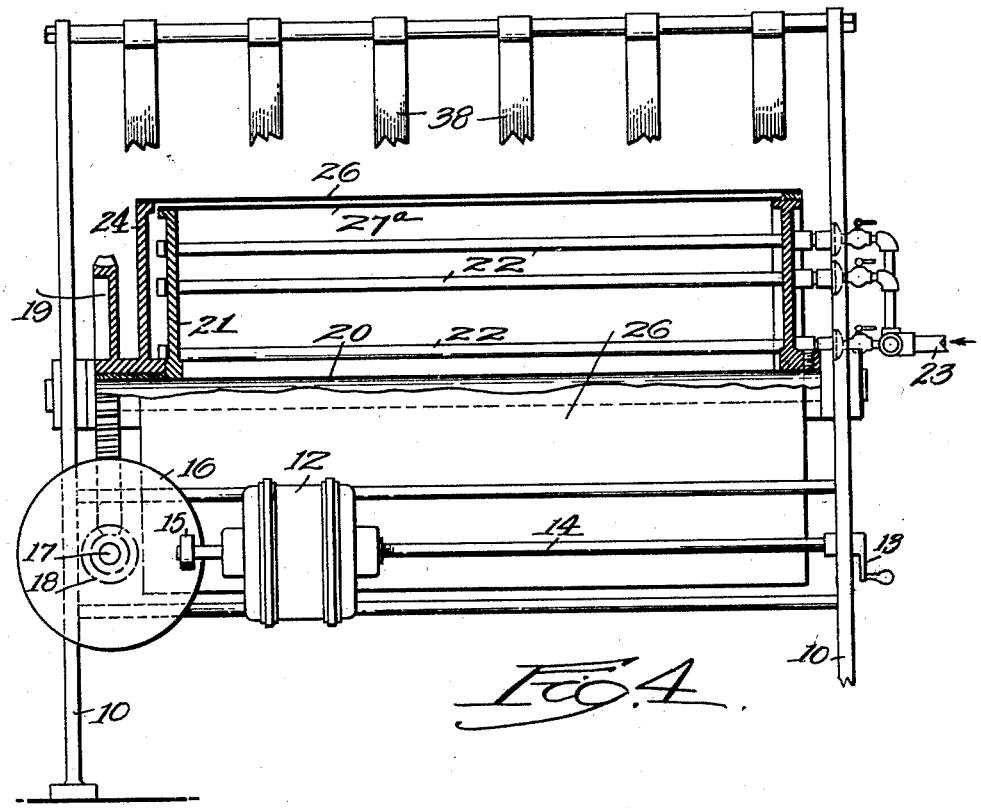
Fig. 4 is a view similar to Fig. 2 thereof.
Figure 5:
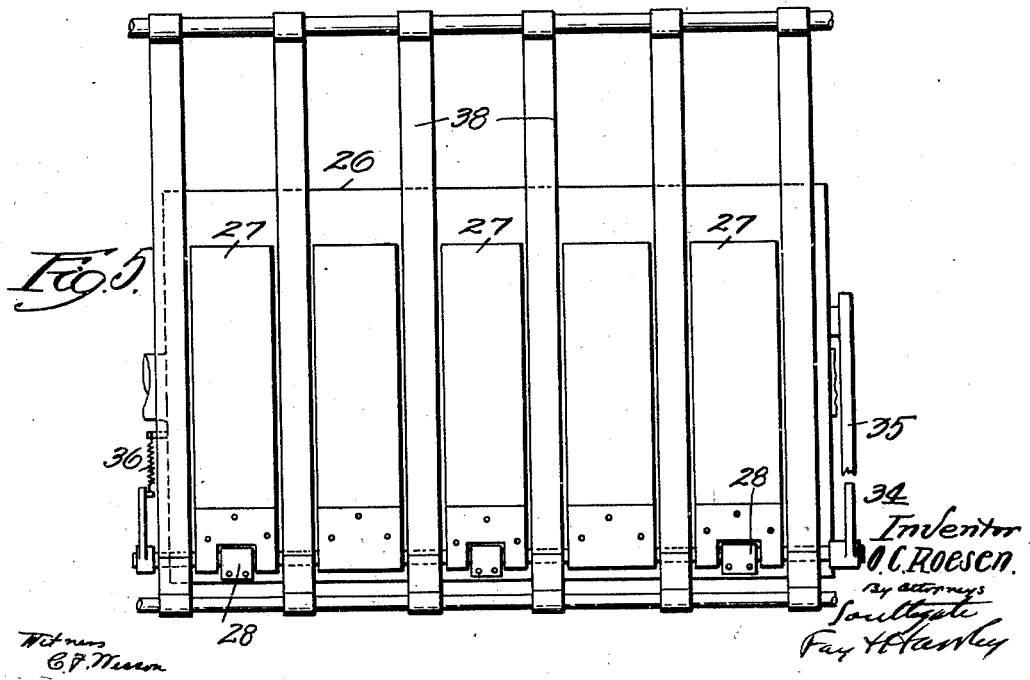
Fig. 5 is a rear view of the same.

In Fig. 3 I have shown the parts in position for delivering a roasted matrix at the left. The cover 27 at the bottom is still open but the lever 34 will be ready to be dropped off the cam 35. This provides for engaging the matrix which is located in guides 38 from which it has been dropped through a chute 39. It is hardly necessary to describe the details in view of Figs. 7 to 11 which show only one of the covers 27 for the purpose of illustrating its operation. In Fig. 7 the cover 27 is in the same position as in Fig. 3 at the bottom. As the drum rotates a little more, the lever 34 drops off the cam 35 as shown in Fig. 8 and the cover is about to grasp the matrix and pull it back against the surface of the drum, which operation is shown in Fig. 9.

In Fig. 10, the drum has rotated around far enough so that the matrix is completely roasted and the cam 35 is just opening the cover, the matrix being shown in contact with the surface of the drum. In Fig. 11, is shown the last process which is the freeing of the matrix by gravity.

It will be seen therefore that in either of these forms the operation is continuous and that as the drum rotates always at the same speed, always takes the matrix at the same point, and always discharges it at the same distance circumferentially from the point of reception, the matrices will always be roasted exactly alike and no judgment is required after the matter has been tested out and the degree of heat and speed determined. If, however, the matrices are coming through too wet or too hot adjustment is secured through the crank 13. The matrices are placed in the machine necessarily in the right position and they are necessarily curved to the proper curvature. The judgment of the operator is entirely eliminated after the first set up and there is no difficulty about getting the matrices into the machine in the proper position.

Although I have illustrated and described only two forms of the invention I am aware of the fact that modifications can be made therein by any person skilled in the art without departing from the scope of the invention as expressed in the claims. Therefore, I do not wish to be limited to all the details of construction herein shown and described, but what I do claim is:

1. In a machine for roasting curved stereotype printing plate matrices, the combination with a receptacle having curved walls carried by the receptacle between which a moist matrix can be clamped to cause it to conform to their shape, means for heating the matrices while held thereby, means for moving said holding walls to carry the matrices from a receiving point to a discharge point, and means for automatically discharging the matrices at said discharge point.

2. In a machine for roasting matrices, the combination with a rotary drum having pivotally mounted means for receiving and holding a plurality of matrices at a time in curved condition, and means for rotating it, of means for heating the drum to dry the matrices as the drum rotates, and means for automatically discharging the matrices at a predetermined time.

3. In a matrix roasting machine, the combination of a rotary drum having walls pivotally mounted on the outside thereof, between which a plurality of matrices can be clamped at a time to dry them, and means for heating the matrices, with means for discharging from between said walls the matrices one by one as they reach a predetermined point.

4. In a matrix roasting machine, the combination of a rotary drum having walls between which a plurality of matrices can be clamped at a time to dry them, and means for heating the matrices, with means for guiding the matrices by gravity into the drum at one point.

5. In a matrix roasting machine, the combination with a cylindrical drum having a radius equal to that of the concave side of a matrix, and means for rotating the drum, of a series of concave covers attached to the drum and rotatable with it for holding the matrices against the drum and shaping them as they are received and dried, and means automatically opening said covers for releasing the matrices.

6. In matrix roasting machine, the combination with a cylindrical drum adapted to receive a plurality of matrices on its surface, and means for rotating the drum at constant speed, of concave covers hinged to the drum at intervals around its circumference, and means for holding each cover down on a matrix to press it against the drum and shape it, and means operating to open said covers when they rotate around to a point near the bottom to discharge the matrices automatically by gravity.

7. In a matrix roaster, the combination with a cylindrical drum rotatable on a horizontal axis, and a cover hinged to the drum, of means for raising the cover as it comes to the top to form a pocket for receiving a matrix, and means for positively closing each cover thereafter to hold the matrix against the drum and operating to release the cover as it nears the bottom to allow the matrix to be discharged by gravity at the bottom.

8. In a matrix roaster, the combination with a cylindrical drum rotatable on a horizontal axis, and a cover hinged to the drum, of a stationary cam for raising the cover at the top, and a plate for holding the cover against the drum as it rotates through part of a revolution and then releasing it to discharge the matrix near the bottom.

In testimony whereof I have hereunto affixed my signature.

OSCAR CHARLES ROESEN.